(12) United States Patent
Konishi et al.

(10) Patent No.: US 8,048,314 B2
(45) Date of Patent: Nov. 1, 2011

(54) METHOD FOR TREATING CHLORINE-CONTAINING WASTE

(75) Inventors: Masayoshi Konishi, Narashino (JP); Hideho Hayashi, Tokyo (JP); Ikuko Watanabe, Ichikawa (JP); Takehiko Itoh, Sanbu-gun (JP); Takayuki Kuroiwa, Narashino (JP); Taichiro Fujimaki, Matsudo (JP)

(73) Assignees: Sumitomo Osaka Cement Co., Ltd., Tokyo (JP); Japan Water Systems Corporation, Tokyo (JP)

( * ) Notice: Subject to any disclaimer, the term of this patent is extended or adjusted under 35 U.S.C. 154(b) by 601 days.

(21) Appl. No.: 12/090,049

(22) PCT Filed: Oct. 16, 2006

(86) PCT No.: PCT/JP2006/320548
§ 371 (c)(1),
(2), (4) Date: May 29, 2008

(87) PCT Pub. No.: WO2007/046325
PCT Pub. Date: Apr. 26, 2007

(65) Prior Publication Data
US 2008/0264872 A1    Oct. 30, 2008

(30) Foreign Application Priority Data

Oct. 17, 2005  (JP) ............................... P2005-301413

(51) Int. Cl.
*C02F 1/62* (2006.01)
(52) U.S. Cl. ........ 210/710; 106/762; 210/712; 210/719; 210/725; 210/737; 210/772; 210/774; 210/912; 588/415

(58) Field of Classification Search ................... 210/710
See application file for complete search history.

(56) References Cited

U.S. PATENT DOCUMENTS 5,403,496 A * 4/1995 Kramer et al. ................. 588/318
5,649,895 A * 7/1997 Fix et al. ........................ 588/256

FOREIGN PATENT DOCUMENTS

| JP | 10-76247 | 3/1998 |
| JP | 2000-354838 | 12/2000 |
| JP | 3304300 | 5/2002 |

(Continued)

*Primary Examiner* — Peter A Hruskoci
(74) *Attorney, Agent, or Firm* — Merchant & Gould P.C.

(57) ABSTRACT

The present invention provides a method and an apparatus for treating a chlorine-containing waste, which can separate and recover a chlorine component from a chlorine-containing waste, and also can achieve a high chlorine removal thereby obtaining a high purity chlorine compound, and can decrease the amount of water for recovering chlorine. The method for treating a chlorine-containing waste of the present invention comprises a washing/filtrating step of adding water to the chlorine-containing waste, followed by mixing to form a first slurry, separating the first slurry into a solid and a filtrate through filtration, and using the resulting solid as a cement raw material; a filtrate treating step of adding a reducing agent and a pH adjustor to the filtrate to form a sediment containing heavy metal and calcium contained in the filtrate, and separating the sediment through filtration; a crystallization step of concentrating the filtrate, from which the sediment has been removed, through heating and evaporation to form a second slurry in which a chlorine compound contained in the filtrate has been crystallized, separating the second slurry into a solid containing a chlorine compound and a mother liquor, and recovering the solid; and a separated mother liquor treating step of returning a portion of the mother liquor to a cement manufacturing facility.

6 Claims, 2 Drawing Sheets

FOREIGN PATENT DOCUMENTS

| | | |
|---|---|---|
| JP | 2002-338312 | 11/2002 |
| JP | 2003-1218 | 1/2003 |
| JP | 2003-138321 | 5/2003 |
| JP | 2004-275903 | 10/2004 |

* cited by examiner

METHOD FOR TREATING CHLORINE-CONTAINING WASTE

TECHNICAL FIELD

The present invention relates to a method and an apparatus for treating a chlorine-containing waste and, more particularly, to a method and an apparatus for treating a chlorine-containing waste, which can recycle a chlorine-containing waste such as burned ash containing chlorine or an exhaust gas or dust of a cement kiln as a harmless cement raw material by treating the chlorine-containing waste in a closed system, and also can recover the removed component as an industrial raw material with quality which enables reuse of the component.

BACKGROUND ART

In a cement manufacturing facility, the amount of a volatile component such as chlorine contained in industrial waste has recently increased in a kiln with the increase in the amount of industrial waste to be treated, and thus an adverse influence may be exerted on the quality of cement and the operation of a cement kiln system. Thus, a chlorine bypass device for removing chlorine from the cement manufacturing facility has been disposed so as to cope with the problem.

This chlorine bypass device is a device in which, in order to remove a volatile component such as chlorine concentrated by repeating volatilization and condensation between a cement kiln and a preheater, chlorine bypass dust containing the solidified volatile component composed mainly of a chlorine compound is produced by bleeding an exhaust gas from a kiln tail portion of the cement kiln, followed by cooling, and the chlorine bypass dust is discharged out of the system thereby removing chlorine from the inside of the cement kiln.

The chlorine bypass dust generated in the chlorine bypass device contains a large amount of the chlorine compound and heavy metal. It is necessary to remove the chlorine compound and heavy metal so as to reuse as the cement raw material again.

Thus, a method of removing a chlorine component by washing the chlorine bypass dust with water has been proposed and put into practical use.

For example, there is proposed a method for a treatment of converting into a cement raw material, which comprises the steps of adding water to a waste containing chlorine thereby converting the waste into a slurry; eluting chlorine contained in the waste; filtering the slurry in which chlorine is eluted; optionally washing the slurry to remove chlorine, separating the slurry into a desalted cake and a filtrate through filtration; using the desalted cake as a cement raw material and adding a chelating agent and a pH adjustor to the filtrate, thereby sedimenting heavy metal and a harmful component and removing them; adding additives to the filtrate after the heavy metal and harmful component have been removed, thereby replacing calcium ions by sodium ions; and using calcium carbonate thus sedimented as a cement raw material (refer to Patent Document 1).

There is also proposed, as a method for separating and recovering a chlorine compound removed by washing the waste with water, a method for treating a waste, which comprises the steps of washing a waste with water thereby eluting a chlorine component and a lead component, thus carrying out solid-liquid separation (washing step); adding an alkali solution to the solid removed by filtration thereby eluting the lead component and converting calcium into a hydroxide, followed by removal through filtration (alkali elution step); adding the filtrate to the filtrate separated in the washing step and adding a sulfidizing agent thereby sedimenting and separating lead (deleading step); adding a carbonic acid source to the deleaded filtrate thereby sedimenting and separating calcium (calcium removal step); and heating the filtrate thereby sedimenting a chloride, followed by separation and recovery of the chloride (salt recovery step) (Patent Document 2).

(Patent Document 1)
Japanese Patent No. 3,304,300
(Patent Document 2)
Japanese Unexamined Patent Application, First Publication No. 2003-1218

DISCLOSURE OF THE INVENTION

However, a conventional method for treating chlorine bypass dust had a problem that a treatment for removing heavy metal must be separately carried out since waste water contains heavy metal, resulting in increased cost of the waste treatment.

Chloride obtained in the step of separating and recovering after sedimenting chloride does not always have high purity. Therefore, there is a problem that it is impossible to obtain high purity chloride which is effectively used.

There is also a problem that a large amount of energy is required when calcium carbonate or chloride is sedimented.

The present invention has been made so as to solve the above problems and an object thereof is to provide a method and an apparatus for treating a chlorine-containing waste, which can separate and recover, as a useful chlorine component, a chlorine component from chlorine bypass dust collected by a chlorine bypass device of a cement burning facility and a chlorine-containing waste such as burned ash containing chlorine, and also can achieve high chlorine removal thereby obtaining a high purity chlorine compound, and can decrease the amount of water for recovering chlorine.

The present invention provides the following method and apparatus for treating a chlorine-containing waste so as to achieve the above object.

Namely, the method for treating a chlorine-containing waste of the present invention is a method for treating a chlorine-containing waste in which an inorganic component contained in a chlorine-containing waste is used as a cement raw material and also chlorine contained in the chlorine-containing waste is recovered, the method including:

a washing/filtrating step of adding water to the chlorine-containing waste, followed by mixing to form a first slurry, separating the first slurry into a solid and a filtrate through filtration, and using the resulting solid as a cement raw material;

a filtrate treating step of adding a reducing agent and a pH adjustor to the filtrate to form a sediment containing heavy metal and calcium contained in the filtrate, and separating the sediment through filtration;

a crystallization step of concentrating the filtrate, from which the sediment has been removed, through heating and evaporation to form a second slurry in which a chlorine compound contained in the filtrate has been crystallized, separating the second slurry into a solid containing a chlorine compound and a mother liquor, and recovering the solid; and a separated mother liquor treating step of returning a portion of the mother liquor to a cement manufacturing facility.

According to the method for treating a chlorine-containing waste, a chlorine compound can be efficiently removed using a small amount of water since water is added to a chlorine-containing waste, followed by mixing to form a first slurry and then the first slurry is separated into a solid and a filtrate through filtration in a washing/filtrating step. Heavy metal and calcium eluted partially in the filtrate are efficiently recovered in a filtrate treating step since heavy metal and calcium contained in the filtrate are separated and recovered as a sediment. Furthermore, a portion of the mother liquor is returned to a cement manufacturing facility through blowing in a separated mother liquor treating step.

Thus, purity of the resulting chlorine compound can be enhanced and also the amount of water used to recover chlorine can be reduced.

The first slurry is preferably prepared by mixing 100 parts by weight of the chlorine-containing waste with 200 parts by weight or more and 400 parts by weight or less of water.

According to the method for treating a chlorine-containing waste, it becomes possible to efficiently remove a chlorine component from a chlorine-containing waste using a small amount of water by using a slurry having an increased content of the chlorine-containing waste.

It is preferred that filtration in the washing/filtrating step is pressure filtration, and the solid after pressure filtration is washed by pumping fresh water to the solid while pressurizing the solid after pressure filtration.

According to the method for treating a chlorine-containing waste, the desalting ratio of the chlorine-containing waste is easily enhanced by washing the solid after pressure filtration with fresh water pumped while pressurizing the solid after pressure filtration Thus, even when the desalted waste is returned to a cement manufacturing facility as a cement raw material, the chlorine component may not be introduced again.

Moisture evaporated in the crystallization step is preferably recovered and reused as water in the washing/filtrating step.

According to the method for treating a chlorine-containing waste, waste water from the system for treating a chlorine-containing waste disappears by reusing moisture evaporated in the crystallization step. Thus, leakage of the chlorine component and heavy metal out of the treatment system may not occur.

A composition containing heavy metal is preferably separated from the filtrate by adding a heavy metal scavenger to the filtrate separated in the filtrate treating step through filtration.

According to the method for treating a chlorine-containing waste, the resulting filtrate is converted into water containing no heavy metal by adding a heavy metal scavenger to the filtrate formed in the filtrate treating step and separating a composition containing heavy metal from the filtrate. Thus, even when waste water is discharged out of the treatment system, leakage of heavy metal may not occur and also environmental pollution may not occur.

The solid separated from the second slurry in the crystallization step is preferably washed with water thereby removing impurities from the solid.

According to the method for treating a chlorine-containing waste, the solid obtained by washing the solid separated from the second slurry in the crystallization step and removing impurities from the solid contains very few impurities. Thus, it becomes possible to effectively use the solid containing very few impurities as an industrial raw material.

The apparatus for treating a chlorine-containing waste of the present invention is an apparatus for treating a chlorine-containing waste in which an inorganic component contained in a chlorine-containing waste is used as a cement raw material and also chlorine contained in the chlorine-containing waste is recovered, the apparatus including:

a washing/filtrating device for adding water to the chlorine-containing waste, followed by mixing to form a first slurry, separating the first slurry into a solid and a filtrate through filtration, and using the resulting solid as a cement raw material;

a filtrate treating device for adding a reducing agent and a pH adjustor to the filtrate to form a sediment containing heavy metal and calcium contained in the filtrate, and separating the sediment through filtration;

a crystallization device for concentrating the filtrate, from which the sediment has been removed, through heating and evaporation to form a second slurry in which a chlorine compound contained in the filtrate has been crystallized, separating the second slurry into a solid containing a chlorine compound and a mother liquor, and recovering the solid; and a separated mother liquor treating device for returning a portion of the mother liquor to a cement manufacturing facility.

According to the apparatus for treating a chlorine-containing waste, a chlorine compound can be efficiently removed using a small amount of water since water is added to a chlorine-containing waste, followed by mixing to form a first slurry and then the first slurry is separated into a solid and a filtrate through filtration in a washing/filtrating step. Heavy metal and calcium eluted partially in the filtrate are efficiently recovered in the a filtrate treating device since heavy metal and calcium contained in the filtrate are separated and recovered as a sediment Furthermore, a portion of the mother liquor is returned to a cement manufacturing facility through blowing in the separated mother liquor treating device.

Thus, it becomes possible to recover a high purity chlorine compound and to recover chlorine using a small amount of water.

The crystallization device is preferably provided with washing device for washing the solid separated from the second slurry thereby removing impurities from the solid.

According to the apparatus for treating a chlorine-containing waste, it becomes easy to form a solid containing very few impurities by washing the solid separated from the second slurry through the washing device to remove impurities from the solid. Thus, it becomes possible to provide a solid containing very few impurities as an industrial raw material.

According to the method for treating a chlorine-containing waste of the present invention, a chlorine compound can be efficiently removed using a small amount of water since water is added to a chlorine-containing waste, followed by mixing to form a first slurry and then the first slurry is separated into a solid and a filtrate through filtration in a washing/filtrating step. Heavy metal and calcium eluted partially in the filtrate are efficiently recovered in a filtrate treating step since heavy metal and calcium contained in the filtrate are separated and recovered as a sediment. Furthermore, purity of the resulting chlorine compound can be enhanced and also the amount of water used to recover chlorine can be reduced since a portion of the mother liquor is returned to a cement manufacturing facility through blowing in a separated mother liquor treating step.

Therefore, a high purity chlorine compound can be efficiently separated and recovered from chlorine bypass dust collected by a chlorine bypass device of a cement burning facility and a high chlorine-containing waste such as burned ash containing chlorine.

According to the apparatus for treating a chlorine-containing waste of the present invention, a chlorine compound can be efficiently removed by a small amount of water since water is added to a chlorine-containing waste, followed by mixing to form a first slurry and then the first slurry is separated into a solid and a filtrate through filtration in a washing/filtrating device. Heavy metal and calcium eluted partially in the filtrate are efficiently recovered in a filtrate treating step since heavy metal and calcium contained in the filtrate are separated and recovered as a sediment. Furthermore, purity of the resulting chlorine compound can be enhanced and also the amount of water used to recover chlorine can be reduced since a portion of the mother liquor is returned to a cement manufacturing facility through blowing in a separated mother liquor treating device.

Therefore, a high purity chlorine compound can be efficiently separated and recovered from chlorine bypass dust collected by a chlorine bypass device of a cement burning facility and a high chlorine-containing waste such as burned ash containing chlorine.

BRIEF DESCRIPTION OF REFERENCE SYMBOL

1 Washing/filtrating section
2 Filtration treatment section
3 Crystallization section
4 Separated mother liquor treating section
11 Mixing tank
12 Filter press
21 to 23, 26 Reaction tank
24 Sedimentation tank
25 Filter press
27 Microfiltration device
31 pH adjusting tank
32 Vacuum pump
33 Crystallizer
34 Heater
35 Condenser
36 Centrifugal separator
37 Vibration dryer
41 Atomizer
42 Cement manufacturing facility
D Chlorine bypass dust
W Water
W' Wash water
S1-S4, S6, S7 Slurry
S5 Supernatant
S8 Mother liquor
C Desalted cake
F1-F5 Filtrate
P Polymer coagulant
T Metal scavenger
MS Heavy metal sludge
MP Suspended substance
ST Steam

BEST MODE FOR CARRYING OUT THE INVENTION

A best mode of a method and an apparatus for treating a chlorine-containing waste of the present invention will be described with reference to the accompanying drawings.

The present aspect is described in detail for purposes of clarity of understanding the object of the invention, and the present invention is not to be limited thereto unless otherwise specified.

Figure 1:
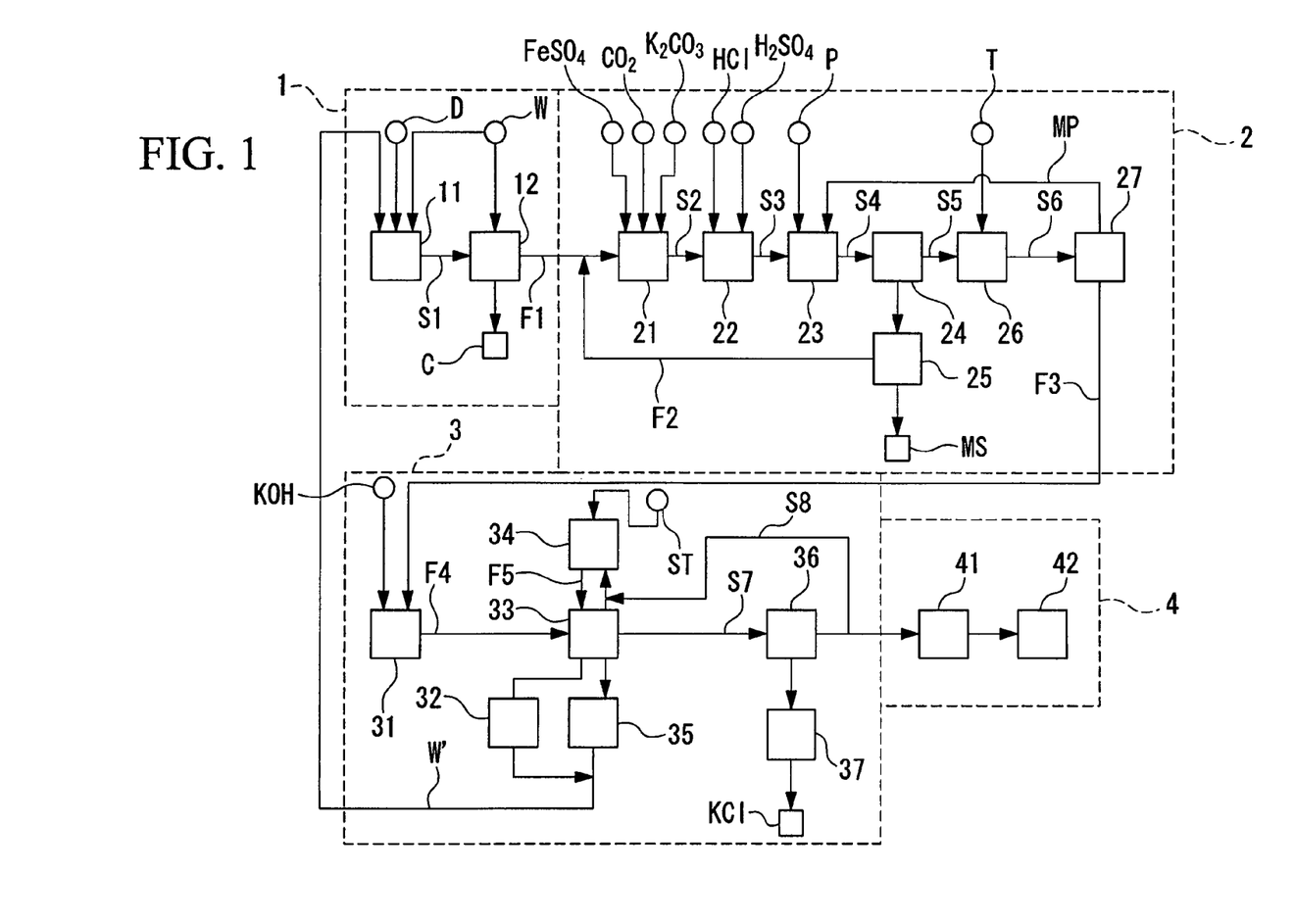
FIG. 1 is a schematic view showing an apparatus for treating a chlorine-containing waste in a cement manufacturing facility according to one embodiment of the present invention.

FIG. 1 is a schematic view showing an apparatus for treating a chlorine-containing waste in a cement manufacturing facility according to one embodiment of the present invention, and is an example of a treatment apparatus in which a calcium component in a chlorine-containing waste is used as a cement raw material and also chlorine contained in the chlorine-containing waste is recovered.

In FIG. 1, the reference symbol 1 denotes a washing/filtrating section (a washing/filtrating device), 2 denotes a filtrate treating section (a filtrate treating device), 3 denotes a crystallization section (a crystallization device), and 4 denotes a separated mother liquor treating section (a separated mother liquor treating device).

The washing/filtrating section 1 is a device in which water is added to chlorine bypass dust (a chlorine-containing waste), followed by mixing to form a first slurry and the first slurry is separated into a desalted cake (a solid) and a filtrate through filtration, and then the resulting desalted cake is used as a cement raw material, and is composed of a mixing tank 11 in which chlorine bypass dust D is mixed with fresh water (hereinafter also referred to as fresh water) W to form a (first) slurry S1; and a filter press (dehydrator) 12 in which the slurry S1 is separated into a desalted cake C and a filtrate F1 through pressure filtration and the desalted cake C obtained after the pressure filtration is washed by pumping fresh water W to the desalted cake C while pressurizing the desalted cake C after pressure filtration. It is also possible to use recovered water (W') obtained by cooling steam generated by evaporation or heating in a crystallizer 33 described hereinafter in place of the above fresh water.

The filtrate treating section 2 is a device in which a reducing agent and a pH adjustor are added to a filtrate and also potassium carbonate is added thereby forming a sediment containing heavy metal and calcium contained in the filtrate, and is composed of a (first) reaction tank 21 in which ferrous sulfate ($FeSO_4$) or ferrous chloride ($FeCl_2$) is added to a filtrate F1 for purposes of reduction, coprecipitation and aggregation of metal and/or an inorganic matter, and potassium carbonate ($K_2CO_3$) or carbon dioxide ($CO_2$) is added so as to react with calcium; a (second) reaction tank 22 in which hydrochloric acid (HCl) or sulfuric acid ($H_2SO_4$) is added to a slurry S2 thus formed thereby lowering the pH and decreasing solubility of heavy metal, thus sedimenting a hydroxide; a (third) reaction tank 23 in which a polymer coagulant P is added to a slurry S3 containing calcium carbonate, and heavy metal converted into SS, or suspended heavy metal, heavy metal formed into fine particles or a heavy metal hydroxide to form a slurry S4; a sedimentation/separation tank 24 in which sedimentation and separation of the slurry S4 are carried out; a dehydrator 25 for separating the sediment into a cake (a heavy metal sludge) MS containing calcium carbonate ($CaCO_3$) and heavy metal, and a filtrate F2 through pressurizing; a (fourth) reaction tank 26 in which a metal scavenger T is added to a supernatant S5 of the sedimentation/separation tank 24 thereby reacting with the supernatant, thus aggregating a trace amount of heavy metal remaining in the supernatant S5; and a microfiltration membrane (MF) device 27 for separating heavy metal collected from the reacted slurry S6 using a membrane filter (MF: microfiltration membrane) and a carryovered fine suspended substance MP in the supernatant S5 from the filtrate F3.

The crystallization section 3 is composed of a pH adjusting tank 31 for adjusting pH by adding an alkali metal compound such as potassium hydroxide (KOH) to a filtrate F3 in which a fine suspended substance MP has been removed by the microfiltration device 27; a crystallizer 33 in which a filtrate F4 having adjusted pH is evacuated by a vacuum pump 32 and then moisture contained in the filtrate F4 heated by circulating between the space with a heater 34 is concentrated by evaporation thereby crystallizing a chlorine compound such as potassium chloride (KCl) contained in the filtrate F4; a condenser 35 for cooling steam generated from the crystallizer 33 to form recovered water which is reused as water for dissolving chlorine bypass dust D; a centrifugal separator 36 for separating a slurry S7 containing a chlorine compound such as potassium chloride (KCl) crystallized therein into the crystallized chlorine compound such as potassium chloride (KCl) and a mother liquor S8 containing no chlorine compound; and a vibration dryer 37 for drying while applying vibration to the crystallized chlorine compound such as potassium chloride (KCl).

The separated mother liquor treating section 4 is composed of a dropper 41 for dropping a portion of the mother liquor S8 separated by the centrifugal separator 36; and a cement manufacturing facility 42 for charging the dropped mother liquor.

Figure 2:
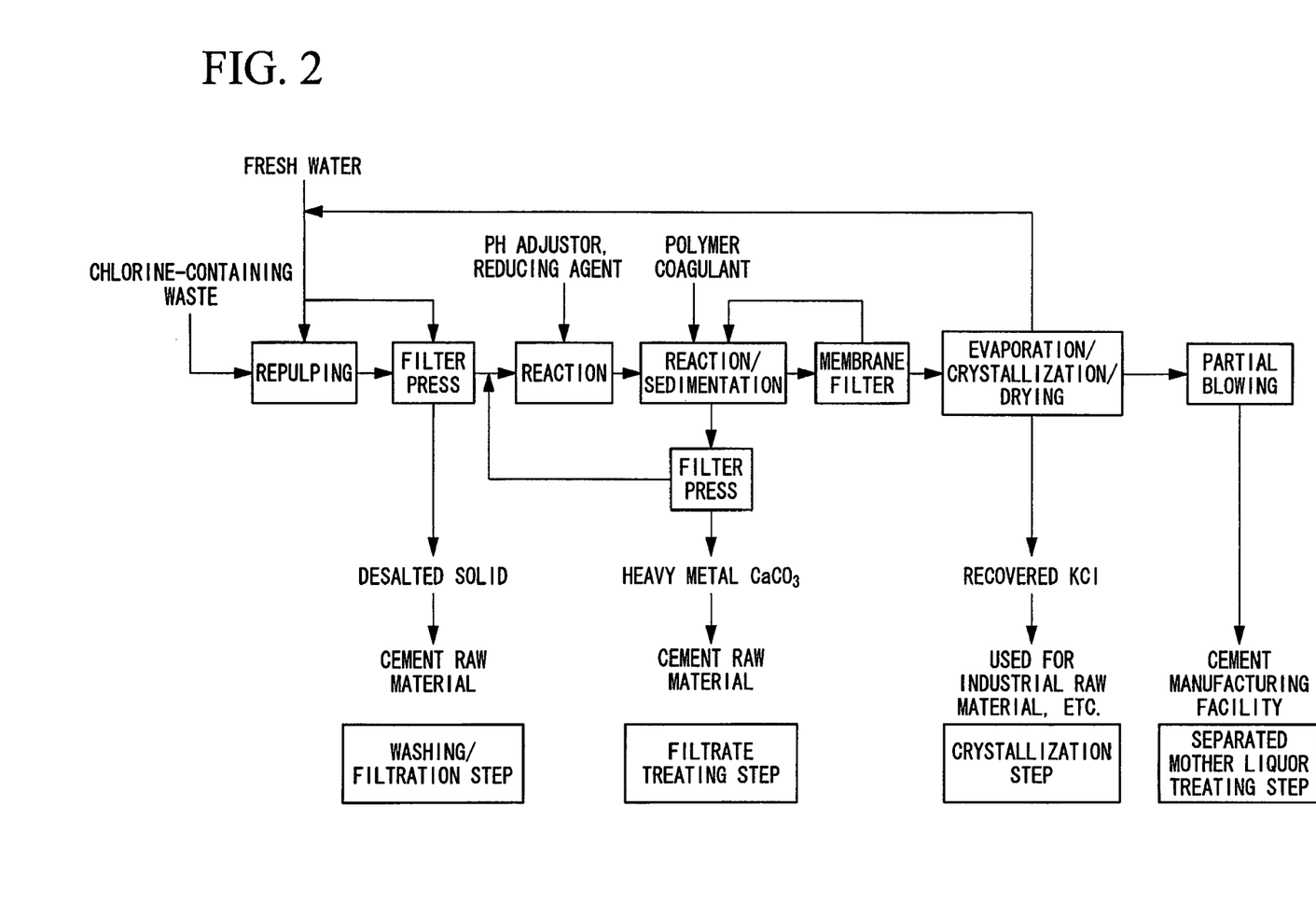
FIG. 2 is a process chart showing a method for treating a chlorine-containing waste in a cement manufacturing facility according to one embodiment of the present invention.

The method for treating a chlorine-containing waste of the present embodiment will be described below with reference to FIG. 1 and FIG. 2.

The method for treating a chlorine-containing waste of the present embodiment is a method for treating a chlorine-containing waste in which an inorganic component contained in a chlorine-containing waste is used as a cement raw material and also chlorine contained in the chlorine-containing waste is recovered, the method including:

a washing/filtrating step of adding water to the chlorine-containing waste, followed by mixing to form a first slurry, separating the first slurry into a solid and a filtrate through filtration, and using the resulting solid as a cement raw material;

a filtrate treating step of adding a reducing agent and a pH adjustor to the filtrate to form a sediment containing heavy metal and calcium contained in the filtrate, and separating the sediment through filtration;

a crystallization step of concentrating the filtrate, from which the sediment has been removed, through heating and evaporation to form a second slurry in which a chlorine compound contained in the filtrate has been crystallized, separating the second slurry into a solid containing a chlorine compound and a mother liquor, and recovering the solid; and a separated mother liquor treating step of returning a portion of the mother liquor to a cement manufacturing facility.

These steps will be described in more detail.

In the method for treating a chlorine-containing waste of the present embodiment, the chlorine-containing waste to be treated is burned ash or fly ash discharged from a municipal refuse incinerator or an industrial waste incinerator, or chlorine-containing dust such as dust containing a high concentration chlorine compound obtained in a chlorine bypass device with which a cement burning facility is provided.

Herein, the treatment in each step will be described in detail using chlorine bypass dust obtained in the chlorine bypass device of the cement burning facility as the object to be treated.

"Washing/Filtrating Step"

First, a 2- to 4-fold amount of fresh water W is added to chlorine bypass dust D as the object to be subjected to desalting washing, followed by stirring to form a slurry. Then, a soluble component such as a chlorine compound contained is eluted and repulped. The amount of water to be added was limited as described above for the following reason. Namely, when the amount of water is not more than two times the amount of the dust, the soluble component in the dust is not sufficiently eluted and a large amount of the soluble component remains in a desalted cake C obtained by filtration through a downstream-side filter press 12. Also, the viscosity of the resulting slurry increases and thus it becomes difficult to transfer the slurry to the subsequent step using a pump.

In contrast, when the amount of water is not less than four times the amount of the dust, the elution amount of other components such as a calcium component and heavy metal increases and thus the amount of a chemical used to remove these components increases in the subsequent step, and also a large amount of steam used in a crystallization step is required.

In the above repulping, the temperature in a mixing tank 11 may be increased to 40° C. or higher so as to increase the dissolution rate of the soluble component. While the chlorine component can be sufficiently dissolved by stirring within 10 hours, stirring for a long time is not preferred since a double salt of calcium, an alkali component and chlorine contained in the dust is formed, and thus a sediment is formed and desalting may not be sufficiently carried out.

A slurry S1 formed by repulping is compressed by the filter press 12 and subjected to solid-liquid separation, and then moisture containing a soluble component remaining in a desalted cake in the filter press 12 is washed with fresh water W. Washing with fresh water W can be efficiently carried out using a small amount of water by pumping fresh water W to the desalted cake while pressurizing the filter press 12 from one direction.

The amount of fresh water W used for washing is preferably 0.5 to 2.0 times the weight of the dust to be subjected to desalting washing.

The content of chlorine in the desalted cake can be sufficiently decreased by washing with fresh water.

The resulting desalted cake C is directly supplied to a cement manufacturing facility, where it is mixed with the other cement raw material, dried and ground, recycled as a powdered cement raw material in a cement burning step, and then burned as a cement clinker.

"Filtrate Treating Step"

The filtrate F1 after compression and water after washing obtained in the washing/filtrating step also contain heavy metal, a calcium component and a chlorine component, except that chlorine in the dust is eluted. Thus, to the filtrate F1 and water after washing, a reducing agent and a pH adjustor are added and also potassium carbonate is added to form a sediment containing heavy metal and calcium contained in the filtrate F1 and water after washing, and then the sediment is separated by filtration Herein, the filtrate F1 is charged in a reaction tank 21 and ferrous sulfate ($FeSO_4$) or ferrous chloride ($FeCl_2$) is added to the filtrate F1 for purposes of reduction, coprecipitation, and aggregation of metal and/or an inorganic matter, and then potassium carbonate ($K_2CO_3$) or carbon dioxide ($CO_2$) is added for purposes of reaction with calcium to form a slurry S2.

For example, heavy metal can be sufficiently removed by forming a sediment of a hydroxide of heavy metal while adjusting the pH of the filtrate F1 within a range from about 9 to 10.5.

The pH adjustor is preferably acidic, and most preferably carbon dioxide. Calcium dissolved in the filtrate F1 can be sufficiently removed by using carbon dioxide.

Herein, calcium dissolved in the filtrate F1 can be completely sedimented as calcium carbonate since potassium carbonate ($K_2CO_3$) is added together with carbon dioxide ($CO_2$).

The alkali carbonate is most preferably potassium carbonate since the finally recovered salt is potassium chloride. Sodium carbonate and sodium hydrogencarbonate can also be used.

When carbon dioxide ($CO_2$) cannot be prepared, calcium dissolved in the filtrate F1 may be treated with only potassium carbonate ($K_2CO_3$).

The slurry S2 containing calcium carbonate ($CaCO_3$) thus obtained is supplied to a reaction tank 22.

In the reaction tank 22, the pH is lowered to a pH range where solubility of heavy metal is low by adding hydrochloric acid (HCl) or sulfuric acid ($H_2SO_4$) to the slurry S2 thereby precipitating a hydroxide. Thus, the slurry S2 is converted into a slurry S3 containing calcium carbonate and heavy metal converted into SS (suspended heavy metal, heavy metal formed into fine particles or a heavy metal hydroxide), which is supplied to a reaction tank 23.

In the reaction tank 23, calcium carbonate and heavy metal converted into SS, or heavy metal formed into fine particles or a heavy metal hydroxide in the slurry S3 are aggregated by adding a polymer coagulant P to the slurry S3. Thus, the slurry S3 is converted into a slurry S4 suspended by an aggregate of calcium carbonate and heavy metal, which is supplied to a sedimentation separation tank 24.

In the sedimentation separation tank 24, the slurry S4 is allowed to stand for a predetermined time. As a result, the aggregate of calcium carbonate and heavy metal contained in the slurry S4 is sedimented, thus separating into a sediment containing the aggregate of calcium carbonate and heavy metal, and a filtrate, and a supernatant S5. The sediment is supplied to a dehydrator 25, while the supernatant S5 is supplied to a reaction tank 26.

In the dehydrator 25, the sediment is separated into a cake (heavy metal sludge) MS containing calcium carbonate ($CaCO_3$) and heavy metal and a filtrate F2 by pressurization and dehydration. The filtrate F2 is recycled by adding to the filtrate F1 to be supplied to the reaction tank 21.

In the reaction tank 26, the supernatant S5 is reacted by adding a metal scavenger T thereby aggregating a trace amount of heavy metal remaining in the supernatant S5. Thus, the supernatant S5 is converted into a slurry S6 containing several % or less of a SS component (suspended substance).

The slurry S6 is supplied to a microfiltration membrane (MF) device 27, and heavy metal collected by a membrane filter (MF: microfiltration membrane) attached in the microfiltration membrane device and a carryovered fine suspended substance MP in the supernatant S5 are separated from a filtrate F3.

As a result of removal of the suspended substance MP from the filtrate F3, the content of the SS component becomes 1 mg/L (1 ppm) or less, and the filtrate is supplied to a crystallization step.

The separated suspended substance MP is formed into a powdered heavy metal-containing inorganic material by drying and optional grinding, which is then treated.

"Crystallization Step"

The dust collected by a chlorine bypass device of a cement manufacturing facility contains, as a chlorine compound, a large amount of potassium chloride. The other chlorine compound includes sodium chloride, and a double salt of heavy metal and a chlorine compound.

In the above washing/filtrating step, heavy metal and calcium are removed as much as possible. In the crystallization step, it is important to obtain, as useful salts, the objective potassium chloride in high purity.

The crystallization step is a step which enables a crystallization operation of preventing the mixing of other alkali metal salts such as sodium chloride so as to sediment a large amount of a chlorine component contained in the filtrate from which the SS component has been removed, which is obtained in the filtrate treating step and is subjected to a microfiltration treatment, to form a useful salt.

In the crystallization step, the filtrate F3 containing a small amount of the SS component, which is obtained in the filtrate treating step and is subjected to a microfiltration treatment, is supplied to a pH adjusting tank 31, where the pH of the filtrate is adjusted to about 12 using potassium hydroxide (KOH) to form a filtrate F4.

Herein, the reason why the pH of the filtrate F3 to about 12 is as follows. Namely, by adjusting the pH to about 12 using potassium hydroxide, adhesion of scale in the subsequent step is prevented, and thus corrosion of the device is prevented and also a decease in purity of potassium chloride obtained after crystallization is prevented.

After adjusting the pH, the filtrate F4 is supplied to a crystallizer 33.

In the crystallizer 33, the filtrate F4 supplied from the pH adjusting tank 31 and the filtrate F5 heated by a heater 34 are combined and concentrated by evaporating moisture contained in the filtrates F4, F5 under reduced pressure using a vacuum pump 32, thereby crystallizing a chlorine compound such as potassium chloride (KCl) contained in the filtrates F4, F5.

In the heater 34, the temperature of the filtrate F5 discharged from the crystallizer 33 is raised to a predetermined temperature within a range from 50 to 80° C. by heat exchange using steam ST, and the filtrate is circulated between the space with the crystallizer 33.

By circulating the filtrates F4, F5 between the heater 34 and the crystallizer 33, they are gradually concentrated by repeating a temperature rise and evaporation to form a slurry S7 containing a large amount of a microcrystalline chlorine compound.

For example, when subjected to heat exchange by the heater 34 using steam ST, the temperature of the filtrates F4, F5 is raised to a temperature of about 60° C. and moisture is evaporated by the crystallizer 34 maintained at reduced pressure, and thus the filtrates are concentrated by about 5 times to crystallize a high purity potassium chloride. By repeating this operation, the filtrates F4, F5 are converted into a slurry S7 in which potassium chloride is crystallized.

Steam evaporated by the crystallizer 33 is reused as wash water W' of the washing/filtrating step after returning to water by the condenser 35.

As described above, by circulating between the crystallizer 33 and the heater 34, a potassium chloride crystallized slurry S7 concentrated to high concentration is separated into a chlorine compound such as potassium chloride (KCl) crystallized by a centrifugal separator 36 and a mother liquor S8 containing no chlorine compound. Upon separation, a chlorine compound having higher purity can be obtained by washing a crystallized chlorine compound as a solid using pure water.

The chlorine compound is dried while applying vibration by a vibration dryer 37 and then used as an industrial raw material such as a useful salt containing high purity potassium chloride. The mother liquor S8 is recycled by the crystallizer 33 and the heater 34.

In the crystallization step, when the filtrates F4, F5 are continuously heated and concentrated by circulating between the crystallizer 33 and the heater 34, concentration of the scale component and heavy metal may occur. When partially blown mother liquor S8 is used as a portion of wash water of the washing/filtrating step, it is possible to recover as the sediment of the washing/filtrating step.

The proportion of the mother liquor S8 to be blown varies depending on the component of the dust, and is preferably from about 1/20 to 1/70 parts by weight based on the weight of the filtrate F3 to be introduced into the crystallization step.

Separation of the highly concentrated slurry S7 is preferably carried out by (1) a method of continuously separating into a solid containing potassium chloride and a mother liquor after the crystal concentration of potassium chloride of the slurry S7 after heating reaches within a range from 10 to 25% by weight, (2) a method of separating after a potassium chloride crystal is grown by temporarily retaining and cooling the potassium chloride crystallized slurry S7, or a combination thereof.

"Separated Mother Liquor Treating Step"

The chlorine bypass dust also contains sodium. Therefore, when the filtrate is continuously heated and concentrated by circulating between the crystallizer 33 and the heater 34, the concentration of sodium increases as heating and concentration proceed, and a problem may arise when potassium chloride is effectively used. Thus, when the concentration of sodium increases, it becomes necessary to blow a portion, if necessary.

The mother liquor S8 separated by the above crystallization step is stably treated by returning a portion to the cement manufacturing process through blowing.

As described above, the apparatus for treating a chlorine-containing waste of the present embodiment includes a washing/filtrating section 1 of adding water to a chlorine-containing waste, followed by mixing to form a slurry, separating the first slurry into a solid and a filtrate through filtration, and using the resulting solid as a cement raw material; a filtrate treating section 2 of adding a reducing agent and a pH adjustor to the filtrate to form a sediment containing heavy metal and calcium contained in the filtrate, and separating the sediment through filtration; a crystallization section 3 of concentrating the filtrate, from which the sediment has been removed, through heating and evaporation to form a second slurry in which a chlorine compound contained in the filtrate has been crystallized, separating the second slurry into a solid containing a chlorine compound and a mother liquor, and recovering the solid; and a separated mother liquor treating section 4 of returning a portion of the mother liquor to a cement manufacturing facility, and thus a chlorine compound such as high purity potassium chloride can be easily recovered and also chlorine can be recovered using a small amount of water.

Therefore, a chlorine compound such as high purity potassium chloride can be separated and recovered from chlorine bypass dust collected by a chlorine bypass device of a cement burning facility and burned ash containing chlorine efficiently and at low cost The method for treating a chlorine-containing waste of the present embodiment includes a washing/filtrating step of adding water to a chlorine-containing waste, followed by mixing to form a slurry, separating the first slurry into a solid and a filtrate through filtration, and using the resulting solid as a cement raw material; a filtrate treating step of adding a reducing agent and a pH adjustor to the filtrate to form a sediment containing heavy metal and calcium contained in the filtrate, and separating the sediment through filtration; a crystallization step of concentrating the filtrate, from which the sediment has been removed, through heating and evaporation to form a second slurry in which a chlorine compound contained in the filtrate has been crystallized, separating the second slurry into a solid containing a chlorine compound and a mother liquor, and recovering the solid; and a separated mother liquor treating step of returning a portion of the mother liquor to a cement manufacturing facility, and thus a high purity chlorine compound can be efficiently separated and recovered from the chlorine-containing waste.

EXAMPLES

The method for treating a chlorine-containing waste of the present invention will be described below in further detail with reference to examples. However, the present invention is not limited to the following examples as long as the scope of the present invention is not departed from.

In this example, as dust to be desalted, chlorine bypass dust which was discharged from a cement kiln and collected by a chlorine bypass device was used.

The composition of the dust is shown in Table 1.

TABLE 1

| Item | Unit | Content |
|---|---|---|
| $SiO_2$ | % by weight | 8.1 |
| $Al_2O_3$ | % by weight | 2.5 |
| $Fe_2O_3$ | % by weight | 0.8 |
| CaO | % by weight | 30.9 |
| MgO | % by weight | 0.7 |
| $SO_3$ | % by weight | 4.6 |
| $Na_2O$ | % by weight | 1.6 |
| $K_2O$ | % by weight | 25.7 |
| Cl | % by weight | 20.8 |
| Cu | mg/Kg | 1,750 |
| Zn | mg/Kg | 813 |
| Pb | mg/Kg | 3,400 |

First, to 100 parts by weight of the dust with the above composition, 300 parts by weight of water was added, followed by stirring to obtain a dust slurry. Then, a soluble component such as a chlorine compound contained therein was eluted and repulped.

The dust slurry was compressed by a filter press 12 (ISDC-H1000×4CW manufactured by ISHIGAKI COMPANY, LTD., filtration area: 6 $m^2$) under an air pressure of 5 Kg/$cm^2$ to obtain 311 parts by weight of a filtrate. While maintaining the compressed state, penetration washing of a desalted cake in the filter press 12 was carried out by injecting 100 parts by weight of fresh water from a filtrate pumping direction.

It was found that the resulting desalted cake showed a yield of 85 parts by weight, a moisture content of 40%, a chlorine content of 0.3%, and a desalting ratio of 98.8%. The desalted cake thus obtained could be reused as a cement raw material.

The amount of the filtrate in which a leachate and a wash fluid obtained in the washing/filtrating step are combined was 415 parts by weight. The filtrate had characteristics of a pH of 13.1 and a conductivity of 200 mS/cm. The potassium content was 47.5 g/L, the chlorine content was 46.2 g/L, the lead content was about 250 ppm, and the calcium content was about 730 ppm.

Then, the filtrate was transferred to the reaction tank 21 and the pH of the filtrate was adjusted to 9.5 by blowing carbon dioxide into the filtrate. Furthermore, ferrous sulfate ($FeSO_4$, 300 ppm) and potassium carbonate ($K_2CO_3$, in a 1.1- to 2-fold molar amount relative to the concentration of Ca of the filtrate) were added to obtain a slurry containing calcium carbonate ($CaCO_3$).

Then, the slurry was transferred to a reaction tank 23 and a polyacrylamide-based polymer coagulant (1 to 2 ppm) was added to the slurry to obtain a slurry in which calcium carbonate ($CaCO_3$) and heavy metal are aggregated in the slurry.

Then, the slurry was transferred to a sedimentation tank 24, and allowed to stand for a predetermined time thereby sedimenting calcium carbonate ($CaCO_3$) and heavy metal in the slurry.

Then, the sediment was taken out from the sedimentation tank 24, and pressurized and dehydrated by a filter press 25 (AUTOPACPRO-614 manufactured by TOKYO ENGINEERING & MANUFACTURING CO., LTD., filtration area: 7 $m^2$) thereby separating into a cake-shaped heavy metal sludge containing calcium carbonate ($CaCO_3$) and heavy metal, and a filtrate.

The sediment obtained in the sedimentation tank 24 contained a large amount of a compound salt of metal such as lead, in addition to calcium. The filtrate passed through the filter press 25 was returned to the reaction tank 21.

The supernatant discharged from the sedimentation tank 24 was transferred to a reaction tank 26 and a metal scavenger (an aminodithioformic acid compound or sodium hydrogensulfide: 50 to 60 ppm) was added to the supernatant, followed by a reaction.

As a result, the supernatant was converted into a slurry containing several % or less of the sedimented SS component (suspended substance).

Then, the slurry was transferred to a microfiltration device 27 and separated into a fine suspended substance containing metal and a filtrate by a membrane filter (MF: Poreflon Module PM-305 manufactured by SUMITOMO ELECTRIC FINE POLYMER INC.). By removing the suspended substance from the filtrate, the concentration of SS component was decreased to 1 mg/L or less.

The filtrate (raw water of crystallization step) had characteristics of a pH of 9.5 and a conductivity of 200 mS/cm. The potassium content was 47.5 g/L, the chlorine content was 46.2 g/L, the lead content was 0.1 ppm, and the calcium content was about 4 ppm.

Then, 410 parts by weight of the filtrate was transferred to a crystallization step.

The filtrate (raw water of crystallization step) was concentrated by repeated heating and evaporation using a forcibly circulating vacuum-heating concentration-crystallization device, and thus a recovered salt was continuously crystallized. The recovered salt was recovered by charging in a centrifugal separator 35 (DAC-24 manufactured by TANABE WILLTEC INC.) together with a mother liquor. In this case, the recovery rate of the recovered salt was 47 parts by weight.

In the crystallization step, the amount of Na gradually increased. Therefore, the mother liquor was blown in the proportion of 1/50 of the amount of the liquid charged and then returned to a cement manufacturing process. The salt thus recovered was a white crystal containing 57% by weight of $K_2O$, 0.7% by weight of $Na_2O$, 7.4% by weight of $SO_3$, and 39.5% by weight of Cl, in terms of a reduced value.

The composition of the recovered salt is shown in Table 2.

TABLE 2

| Item | Unit | Content |
| --- | --- | --- |
| $SiO_2$ | mg/Kg | <1 |
| $Al_2O_3$ | mg/Kg | <1 |
| $Fe_2O_3$ | mg/Kg | <1 |
| CaO | mg/Kg | 170 |
| MgO | mg/Kg | 8 |
| $SO_3$ | mg/Kg | 74,000 |
| $Na_2O$ | mg/Kg | 7,000 |
| $K_2O$ | mg/Kg | 570,000 |
| Cl | mg/Kg | 395,000 |
| Cu | mg/Kg | <20 |

TABLE 2-continued

| Item | Unit | Content |
| --- | --- | --- |
| Zn | mg/Kg | <20 |
| Pb | mg/Kg | <10 |

INDUSTRIAL APPLICABILITY

According to the method for treating a chlorine-containing waste of the present invention, a chlorine compound can be efficiently removed using a small amount of water since water is added to a chlorine-containing waste, followed by mixing to obtain a first slurry and then the first slurry is separated into a solid and a filtrate through filtration in a washing/filtrating step. Heavy metal and calcium eluted partially in the filtrate are efficiently recovered in a filtrate treating step since heavy metal and calcium contained in the filtrate are separated and recovered as a sediment. Furthermore, purity of the resulting chlorine compound can be enhanced and also the amount of water used to recover chlorine can be reduced since a portion of the mother liquor is returned to a cement manufacturing facility through blowing in a separated mother liquor treating step.

Therefore, a high purity chlorine compound can be efficiently separated and recovered from chlorine bypass dust collected by a chlorine bypass device of a cement burning facility and a high chlorine-containing waste such as burned ash containing chlorine.

According to the apparatus for treating a chlorine-containing waste of the present invention, a chlorine compound can be efficiently removed by a small amount of water since water is added to a chlorine-containing waste, followed by mixing to obtain a first slurry and then the first slurry is separated into a solid and a filtrate through filtration in a washing/filtrating device. Heavy metal and calcium eluted partially in the filtrate are efficiently recovered in a filtrate treating step since heavy metal and calcium contained in the filtrate are separated and recovered as a sediment. Furthermore, purity of the resulting chlorine compound can be enhanced and also the amount of water used to recover chlorine can be reduced since a portion of the mother liquor is returned to a cement manufacturing facility through blowing in a separated mother liquor treating device.

Therefore, a high purity chlorine compound can be efficiently separated and recovered from chlorine bypass dust collected by a chlorine bypass device of a cement burning facility and a high chlorine-containing waste such as burned ash containing chlorine.

The invention claimed is:

1. A method for treating a chlorine-containing waste in which an inorganic component contained in a chlorine-containing waste is used as a cement raw material and also chlorine contained in the chlorine-containing waste is recovered, the method comprising:
   a washing/filtrating step of adding water to the chlorine-containing waste, followed by mixing to form a first slurry, separating the first slurry into a solid and a filtrate through filtration, and using the resulting solid as a cement raw material;
   a filtrate treating step of adding a reducing agent, a pH adjustor, and potassium carbonate to the filtrate to form a sediment containing heavy metal and calcium carbonate contained in the filtrate, and separating the sediment through filtration;

a crystallization step of concentrating the filtrate, from which the sediment has been removed, through heating and evaporation to form a second slurry in which a chlorine compound contained in the filtrate has been crystallized, separating the second slurry into a solid containing a chlorine compound including potassium chloride and a mother liquor, and recovering the solid; and a separated mother liquor treating step of returning a portion of the mother liquor to a cement manufacturing facility.

2. The method for treating a chlorine-containing waste according to claim 1, wherein the first slurry is prepared by mixing 100 parts by weight of the chlorine-containing waste with 200 parts by weight or more and 400 parts by weight or less of water.

3. The method for treating a chlorine-containing waste according to claim 1, wherein filtration in the washing/filtrating step is pressure filtration, and the solid after pressure filtration is washed by pumping fresh water to the solid while pressurizing the solid after pressure filtration.

4. The method for treating a chlorine-containing waste according to claim 1, wherein moisture evaporated in the crystallization step is recovered and reused as water in the washing/filtrating step.

5. The method for treating a chlorine-containing waste according to claim 1, wherein a composition containing heavy metal is separated from the filtrate by adding a heavy metal scavenger to the filtrate separated in the filtrate treating step through filtration.

6. The method for treating a chlorine-containing waste according to claim 1, wherein the solid separated from the second slurry in the crystallization step is washed with water thereby removing impurities from the solid.

* * * * *